United States Patent
Sharoukhov et al.

(10) Patent No.: US 12,008,737 B2
(45) Date of Patent: Jun. 11, 2024

(54) DEEP LEARNING MODEL FOR NOISE REDUCTION IN LOW SNR IMAGING CONDITIONS

(71) Applicant: Nanotronics Imaging, Inc., Cuyahoga Falls, OH (US)

(72) Inventors: Denis Sharoukhov, Brooklyn, NY (US); Tonislav Ivanov, Brooklyn, NY (US); Jonathan Lee, New York, NY (US)

(73) Assignee: Nanotronics Imaging, Inc., Cuyahoga Falls, OH (US)

(*) Notice: Subject to any disclaimer, the term of this patent is extended or adjusted under 35 U.S.C. 154(b) by 229 days.

(21) Appl. No.: 17/444,499

(22) Filed: Aug. 5, 2021

(65) Prior Publication Data

US 2022/0044362 A1     Feb. 10, 2022

Related U.S. Application Data (60) Provisional application No. 63/062,589, filed on Aug. 7, 2020.

(51) Int. Cl.
*G06T 5/70* (2024.01)
*G06T 3/4046* (2024.01)
*G06T 5/50* (2006.01)

(52) U.S. Cl.
CPC ............ *G06T 5/70* (2024.01); *G06T 3/4046* (2013.01); *G06T 5/50* (2013.01); *G06T 2207/20081* (2013.01); *G06T 2207/20084* (2013.01)

(58) Field of Classification Search
CPC ......... G06T 5/002; G06T 3/4046; G06T 5/50; G06T 2207/20081; G06T 2207/20084;
(Continued)

(56) References Cited

U.S. PATENT DOCUMENTS 9,922,272 B2 *  3/2018  Cheng ................... G06F 18/251
10,977,781 B2 *  4/2021  Nie ............................ G06T 5/70
(Continued)

FOREIGN PATENT DOCUMENTS

CN      107203985 A      9/2017
CN      111476125 A      7/2020
(Continued)

OTHER PUBLICATIONS

Mocan et al. "Automatic Detection of Tumor Cells in Microscopic Images of Unstained Blood using Convolutional Neural Networks." 2018 IEEE 14th International Conference on Intelligent Computer Communication and Processing (ICCP). IEEE, 2018. (Year: 2018).*
(Continued)

*Primary Examiner* — Edward F Urban
*Assistant Examiner* — Benedict E Lee
(74) *Attorney, Agent, or Firm* — DLA PIPER LLP (US)

(57) ABSTRACT

Embodiments disclosed herein are generally related to a system for noise reduction in low signal to noise ratio imaging conditions. A computing system obtains a set of images of a specimen. The set of images includes at least two images of the specimen. The computing system inputs the set of images of the specimen into a trained denoising model. The trained denoising model is configured to output a single denoised image of the specimen. The computing system receives, as output from the trained denoising model, a single denoised image of the specimen.

20 Claims, 5 Drawing Sheets

(58) Field of Classification Search
CPC . G06T 2207/10016; G06T 2207/30024; G06T 2207/10056; G06T 2207/10064
See application file for complete search history.

(56) References Cited

U.S. PATENT DOCUMENTS

| | | | |
|---|---|---|---|
| 11,151,702 B1* | 10/2021 | Tico | G06T 5/92 |
| 2013/0022268 A1 | 1/2013 | Kishima | |
| 2017/0213321 A1* | 7/2017 | Matviychuk | G06F 18/28 |
| 2019/0188838 A1 | 6/2019 | Nie et al. | |
| 2019/0244347 A1 | 8/2019 | Buckler et al. | |
| 2020/0242759 A1* | 7/2020 | Li | G06T 7/13 |
| 2021/0342496 A1* | 11/2021 | Spies | G06N 3/088 |
| 2022/0172360 A1* | 6/2022 | Galeotti | G06T 7/11 |
| 2022/0183646 A1* | 6/2022 | Fouras | A61B 5/08 |

FOREIGN PATENT DOCUMENTS

| | | |
|---|---|---|
| JP | 2013025466 A | 2/2013 |
| KR | 10-2016-0053612 | 5/2016 |
| KR | 10-2019-0130423 | 11/2019 |
| TW | 201832181 | 9/2018 |
| TW | 202004513 | 1/2020 |
| TW | 202020736 | 6/2020 |
| WO | 2019/090213 | 5/2019 |
| WO | 2020/069489 | 4/2020 |

OTHER PUBLICATIONS

Qu et al. "Edges Detection of Nanowires and Adaptively Denoising with Deep Convolutional Neural Network from SEM Images." 2020 IEEE 20th International Conference on Nanotechnology (IEEE-NANO). IEEE, 2020. (Year: 2020).*

PCT International Application No. PCT/US21/44633, International Search Report and Written Opinion of the International Searching Authority, dated Nov. 15, 2021, 10 pages.

Office Action and Search Report from Taiwan Patent Application No. 110129183, dated Oct. 12, 2023, 7 Pages.

Office Action and Search Report from Taiwan Patent Application No. 112120866, dated Oct. 19, 2023, 20 Pages.

Office Action for Japanese Patent Application No. 2023507436, dated Jan. 12, 2024, 9 pages.

Office Action from Korean Patent Application No. 10-2023-7004079, dated Feb. 29, 2024, 13 Pages.

* cited by examiner

DEEP LEARNING MODEL FOR NOISE REDUCTION IN LOW SNR IMAGING CONDITIONS

CROSS-REFERENCE TO RELATED APPLICATIONS

This application claims priority to U.S. Provisional Application Ser. No. 63/062,589, filed Aug. 7, 2020, which is hereby incorporated by reference in its entirety.

BACKGROUND

Noise is a detrimental but inherent component of imaging systems and is especially a problem when imaging fluorescent samples that generally produce low signal. High exposure times are typically required, but samples are typically light-sensitive and degrade under illumination. This is particularly problematic when samples must be preserved after imaging, where exposure time is minimized. Consequently, low exposure time leads to a high amount of noise in the image, i.e., very low signal-to-noise ratio (SNR). Generally, the objective is to maximize image quality while limiting light exposure.

SUMMARY

In some embodiments, a system is disclosed herein. The system includes an imaging apparatus and a computing system. The imaging apparatus is configured to capture images of a specimen on a background. The computing system is in communication with the imaging apparatus. The computing system includes one or more processors and a memory. The memory has programming instructions stored thereon, which, when executed by the one or more processors, causes the computing system to perform operations. The operations include obtaining, by the computing system, a set of images of the specimen from the imaging apparatus. The set of images includes at least two images of the specimen against the background. The operations further include denoising, by the computing system, the set of images by inputting the set of images of the specimen into a denoising model. The denoising model is configured to output a single denoised image of the specimen. The operations further include generating, as output from the denoising model, the single denoised image of the specimen.

In some embodiments, a method is disclosed herein. A computing system obtains a set of images of the specimen from the imaging apparatus. The set of images includes at least two images of the specimen against the background. The computing system denoises the set of images by inputting the set of images of the specimen into a denoising model. The denoising model is configured to output a single denoised image of the specimen. The computing system generates, as output from the denoising model, the single denoised image of the specimen.

In some embodiments, a non-transitory computer readable medium is disclosed herein. The non-transitory computer readable medium includes one or more sequences of instructions, which, when executed by one or more processors, causes a computing system to perform operations. The operations include obtaining, by the computing system, a set of images of the specimen from the imaging apparatus. The set of images includes at least two images of the specimen against the background. The operations further include denoising, by the computing system, the set of images by inputting the set of images of the specimen into a denoising model. The denoising model is configured to output a single denoised image of the specimen. The operations further include generating, as output from the denoising model, the single denoised image of the specimen.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Low signal to noise ratio (SNR) conditions can degrade microscopy imaging quality, which complicates downstream analysis. One conventional method to improve SNR by reducing noise is to average a large number of sequentially acquired images. However, this increase in acquisition time reduces throughput and is problematic for light-sensitive samples.

One or more techniques described herein improves upon conventional processes by using a deep learning model based on the U-Net architecture that significantly reduces the number of images required to obtain exceptionally high SNR. For example, the present denoising model may take at least two (e.g., five) noisy grayscale images as an input and may generate, as output, a single denoised image. In some embodiments, the denoising model may be trained on synthetically generated examples with added noise and fine-tuned on real data. The present approach enhances sample features while minimizing degradation from prolonged light exposure.

Conventional methods to remove noise involve averaging. A large number of images are collected at the same location under the same imaging conditions, and then averaged to remove the noise from the signal. Though effective at improving SNR, this approach is time consuming and causes a great deal of intensity degradation to light-sensitive samples, termed photo-bleaching, due to the need to collect a large number of images for sufficient denoising.

In contrast, the one or more technique described herein use a deep learning model, based on the U-Net architecture, to produce a denoised image from a small number of input images collected at low exposures. In some embodiments, the denoising model may be first trained on synthetic data, and then fine-tuned on real data. By first using synthetic data, this training procedure avoids the necessity of collecting and bleaching a large number of real samples. Through such process, the present system demonstrates a high degree of denoising on images with low SNR ratio using only a few noisy images. Achieving the same quality of denoising using traditional approaches requires a prohibitively large number of examples.

Traditional approaches to denoising, such as mean and median projection, involve acquiring many noisy images at the same location and combining them to cancel out random noise. These techniques are very popular because they are relatively simple to compute. However, they are limited because they can only eliminate noise with symmetric distributions, such as Gaussian noise. Various other methods using image priors as a regularization have been proposed. Though these methods achieve more reasonable output quality than traditional approaches, the models are slow in real-time due to their large number of computations. For example, the conventional models typically require around 22 MS and 500 ms per image, respectively. In contrast, the present model is able to achieve adequate denoising performance in about 1 ms per image.

In the past few years, the advancement of convolutional neural networks (CNNs) has led to great improvement in image denoising. CNNs are neural networks with many layers that perform a series of convolutions with various trainable filters on the input image and subsequent resulting feature maps. One such system suggested a denoising CNN (DnCNN) by incorporating residual learning and batch normalization, which outperforms traditional non-CNN based methods. More recently, other CNN methods, such as RED30, MemNet, BM3D-Net, MWCNN and FFDNet have also been developed with promising denoising performance. However, these methods assume Gaussian noise with a constant standard deviation, and they do not perform well on noise levels higher they what the models were trained on. In contrast, the present denoising model performs well even in the presence of higher level of noise.

Additionally, blind CNN denoisers that do not make the constant sigma assumption, such as FFDNet and Cabinet, have been proposed. These methods achieve satisfying results on real noisy images but require training with a higher noise level. In contrast, the present denoising model may trained with a moderate amount of noise and performs well on both low and high noise levels.

Furthermore, most CNN methods to denoising are applied to the field of photo-editing and take only a single image as input. The present system is not limited to having a single image since the present automated fluorescent imaging platform (nSpec) can acquire any number of images for further post-processing. The present system uses at least two (e.g., five) images taken at low exposures, allowing more robustness due to the use of multiple images and avoiding photo-bleaching by using low exposure times.

In some embodiments, the present denoising model may be used with fluorescent imaging techniques. In some embodiments, the present denoising model may be used for bright field imaging. In some embodiments, the present denoising model may be used for dark field imaging. In some embodiments, the present denoising model may be used in microscopy with reflected light (episcopic) microscopy. In some embodiments, the present denoising model may be used with transmitted light (diascopic) illumination.

Figure 1:
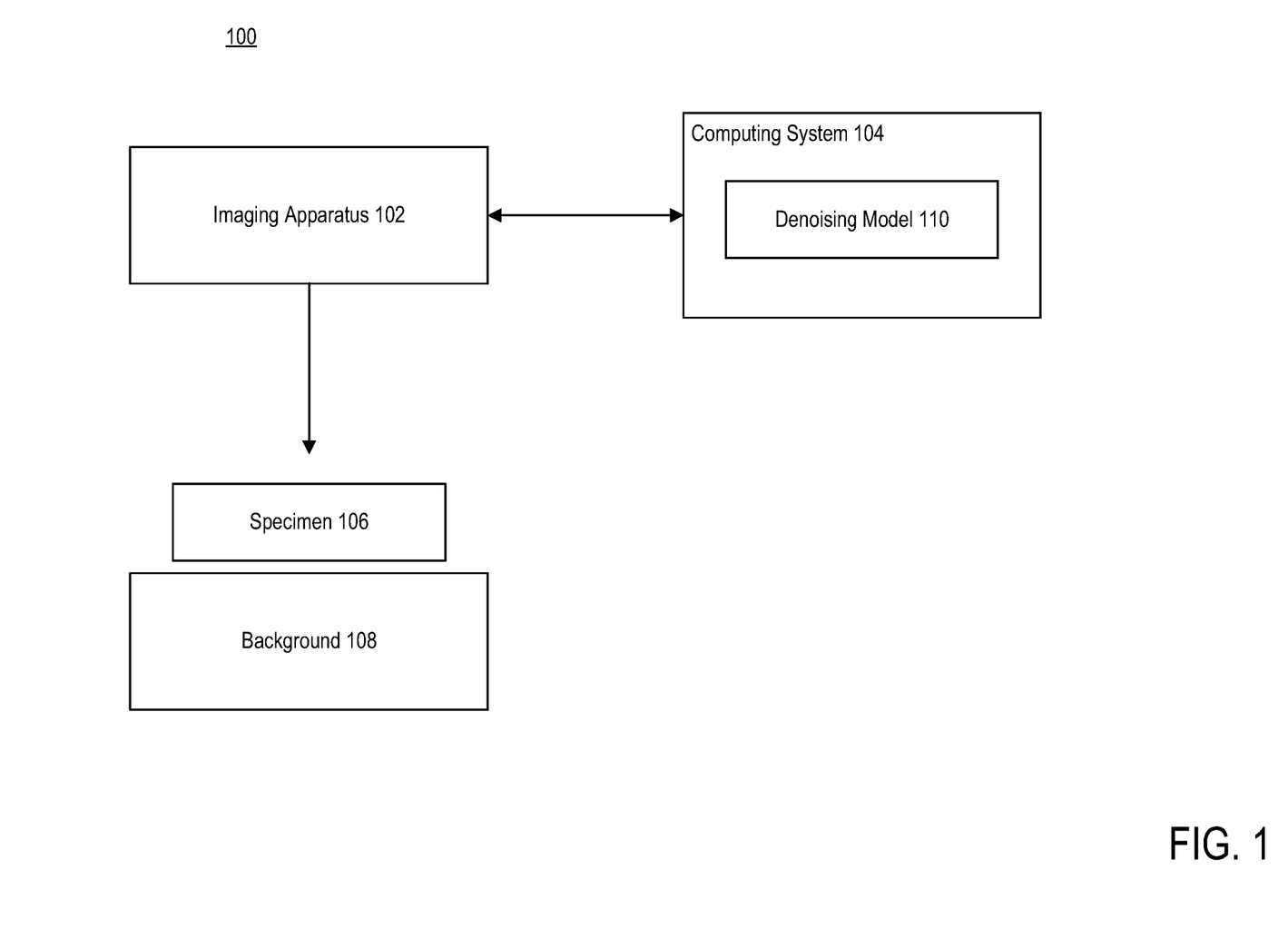
FIG. 1 is a block diagram illustrating an exemplary computing environment, according to example embodiments.

FIG. 1 is a block diagram illustrating an exemplary computing environment 100, according to example embodiments. As shown, computing environment 100 may include an imaging apparatus 102 and a computing system 104. Imaging apparatus 102 may be configured to capture one or more images of an specimen 106 against a background 108.

As provided above, low signal to noise ratio conditions can degrade microscopy imaging quality, which complicates downstream analysis. To account for this, imaging apparatus 102 may be configured to capture one or more images of specimen 106 against background 108 and provide the one or more images to computing system 104 for denoising. While computing system 104 may be shown as a component that is separate from imaging apparatus 102, those skilled in the art understand that computing system 104, or functionality thereof, may be incorporated into imaging apparatus 102 instead of being a separate component.

As shown, computing system 104 may include a denoising model 110. Denoising model may be configured to receive one or more images of specimen 106 and generate a denoised image for downstream analysis. In some embodiments, denoising model 110 may be representative of a convolutional neural network (CNN) based on the U-Net model.

Figure 2:
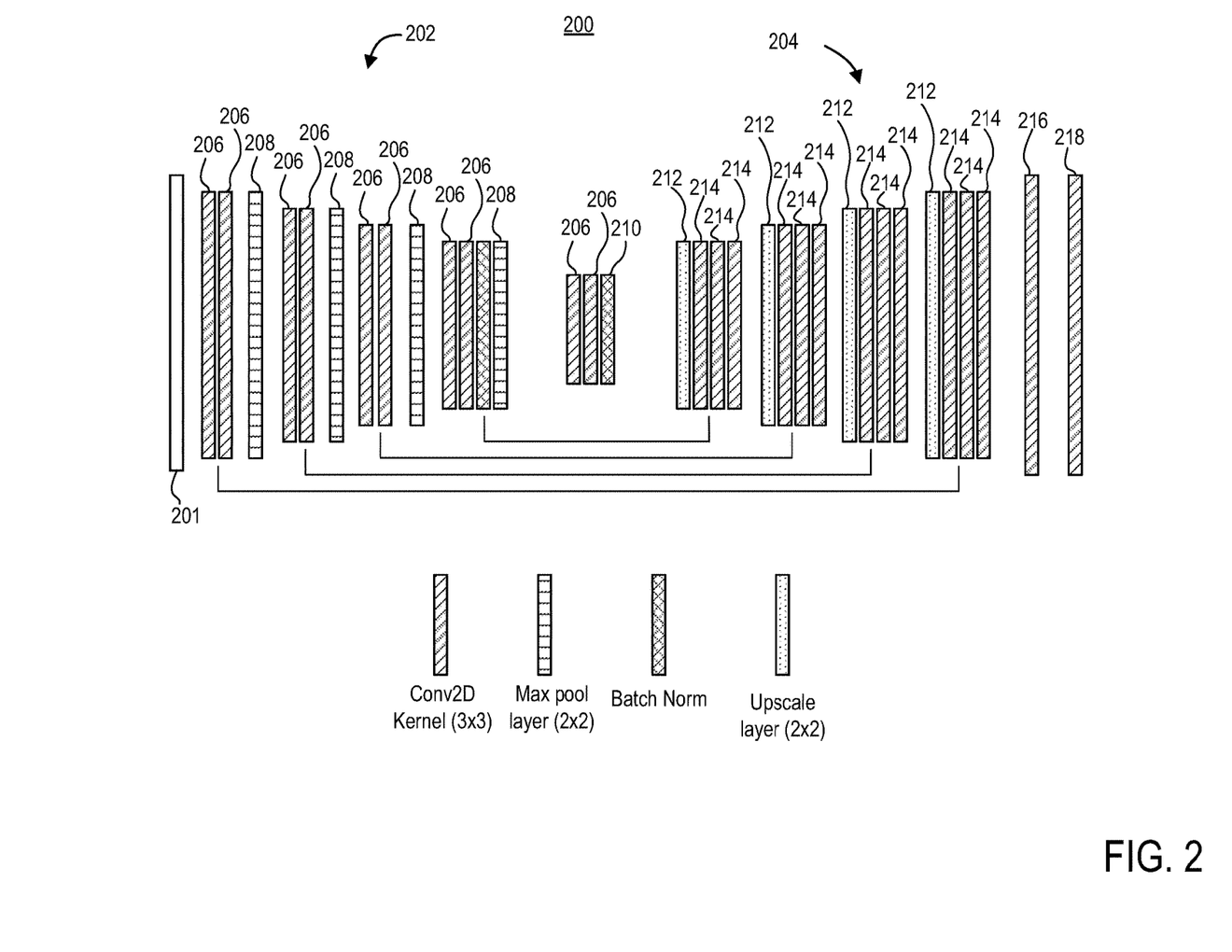
FIG. 2 illustrates example architecture of the denoising model, according to example embodiments.

FIG. 2 illustrates an example architecture 200 of the denoising model 110, according to example embodiments. In some embodiments, input 201 to denoising model 110 may be a stack of noisy images (e.g., five images) taken at the same location. Denoising model 110 may be partitioned into two halves: a convolutional/downsampling half 202 on the left followed by a deconvolutional/upsampling half 204 on the right. In some embodiments, downsampling half 202 may include pairs of convolutional layers 206 followed by a max-pool layer 208 (except the last layer). In some embodiments, the last two pairs of convolutional layers 206 include a batch normalization layer 210 for numerical stability. The number of feature maps in the various layers may starts at four and may double up to sixty-four for the last pair of layers.

In some embodiments, upsampling half 204 may include of four blocks that include an upsampling layer 212 followed by a triplet of convolutional layers 214. The number of feature maps may reduce inversely from sixty-four at the end of the left half back to four. At the end of upsampling half 204, another convolutional layer 216 of two feature maps may be added to improve the sharpness of features in the image. Finally, denoising model 110 may output a denoised single-channel image 218 the size of the input image.

In some embodiments, a synthetic dataset and an empirical dataset may be used for training and testing. For example, the images for training may be 16-bit, but only span a dynamic range of 1350 out of the full 16-bit range of 65536. In some embodiments, a plurality of images may be generated with a flat background and containing one or more (e.g., three) geometric objects, such as polygons, circles, ellipses, and the like. In some embodiments, defect examples from a library of known defects may be added. The signal intensity of the geometric objects may be varied—above the background intensity (white), near background intensity (gray), and below background intensity (dark).

A summary of exemplary intensities is given in Table 1 below:

TABLE 1

| Feature | Intensity |
| --- | --- |
| Dark | 400-500 |
| Grey | 1100-1200 |
| Background | 1190-1210 |
| White | 1650-1750 |

In some embodiments, to generate the geometric objects, triangles may be placed inside a background image, and shape irregularities may be introduced to reproduce the empirical dataset. This may be performed by randomly cutting out parts of the triangle using another triangle. To replicate the empirical data, each dark triangle may include an intensity gradient along the top, ranging from background value to triangle's value, which may span two-fifths of the triangle's height. For example, the probability of placing a dark triangle may be 0.5, a gray triangle is 0.35, and a white triangle is 0.15.

The empirical dataset may be collected using an automated fluorescence inspection tool. In some embodiments, imaging may be performed by imaging apparatus 102. For example, imaging apparatus 102 may use a 10× objective (e.g., Olympus, MPlanFL N, NA=0.3) on a 4H—SiC sample with 39 um thick EPI layer. In some embodiments, to excite photoluminescent response an ultraviolet LED may be used as the light source with peak wavelength of about 369 nm. In some embodiments, for emission, a green bandpass filter may be used. In some embodiments, power at the sample plane may be approximately 500 Mw. In some embodiments, two empirical data sets may be collected—one with a lower level of noise at 100 ms exposure, and one with a higher level of noise at 50 ms exposure. In some embodiments, data from twelve different locations on the sample may be collected. In some embodiments, ten noisy images and a background image (with the light source turned off) may be collected at each location with every exposure (level of noise). In some embodiments, a ground truth image may be collected at 1000 ms exposure at each location. Additionally, images for flat field correction may be collected from a uniform portion of the sample. Flat field correction may be applied to each image as follows:

$$I_{corrected} = \frac{I - DF}{FF}$$

where DF is the background image and FF is the flat field correction image. The empirical data may contain bright, gray, and dark triangular features. The triangular features may be slightly irregular, sometimes cut in pieces, and some had an intensity gradient. White speckles and scratches were present in the empirical data, but these were not of interest and were not included in the synthetic data.

In some embodiments, denoising model 110 may first be trained on a synthetic dataset. Synthetic dataset may include, but is not limited to, data approximating known images, golden templates, pertinent warped images of known features, and the like. For example, one-hundred images were set aside for testing; the remaining images may be split into a set of 800 for training and 200 for validation. In some embodiments, a plurality (e.g., five) of noisy images may be generated for every synthetic image by adding Gaussian noise. For example, for the test data, low ($\sigma=200$ or 13%), medium ($\sigma=600$ or 40%), and high ($\sigma=1000$ or 66%) Gaussian noise may be added. Generally, noise may be added as dictated by the image application.

After training denoising model 110 on the synthetic data, denoising model 110 may be fine-tuned on the empirical dataset. For example, eight of the twelve image locations may be used for training, and the other four for testing. Three of those four locations may be proximal and partially overlapping. Fine-tuning may be performed on the medium level of noise images (50 ms exposure) and testing was done on images with low (100 ms), medium (50 ms), and high (25 ms) levels of noise.

A comparison between the present method and the traditional denoising approach of mean projection is presented here. Mean projection sums up N images and averages their intensities per pixel to get an output image:

$$I_{p}roj = \left(\frac{1}{N}\right)\sum_{k=1}^{N} I_i$$

For comparison, each set of five noisy images in the synthetic dataset and each set of ten noisy images in the empirical dataset was averaged. For detailed comparison at high levels of noise, ten synthetic sets of one hundred noisy images were generated, and ten synthetic sets of a thousand noisy image.

Model performance was quantified by calculating the Mean Squared Error (MSE) and the Peak Signal-To-Noise Ratio (PSNR). The MSE of N images is computed as follows:

$$MSE = \left(\frac{1}{N}\right)\sum_{k=1}^{N} \sum_{k,y} (I_i(x, y) - Ti(x, y))^2$$

where I is the denoised image and e is the corresponding ground truth image. Since the data is 16-bit and does not span the entire range, express the MSE may be expressed as a percentage of the dynamic range:

$$\% \, MSE = 100 * \frac{MSE}{R}$$

where R is the dynamic range of the data. The PSNR is computed as follows:

$$SNR = 10\log_8 10 \frac{R}{MSE}$$

Figure 4:
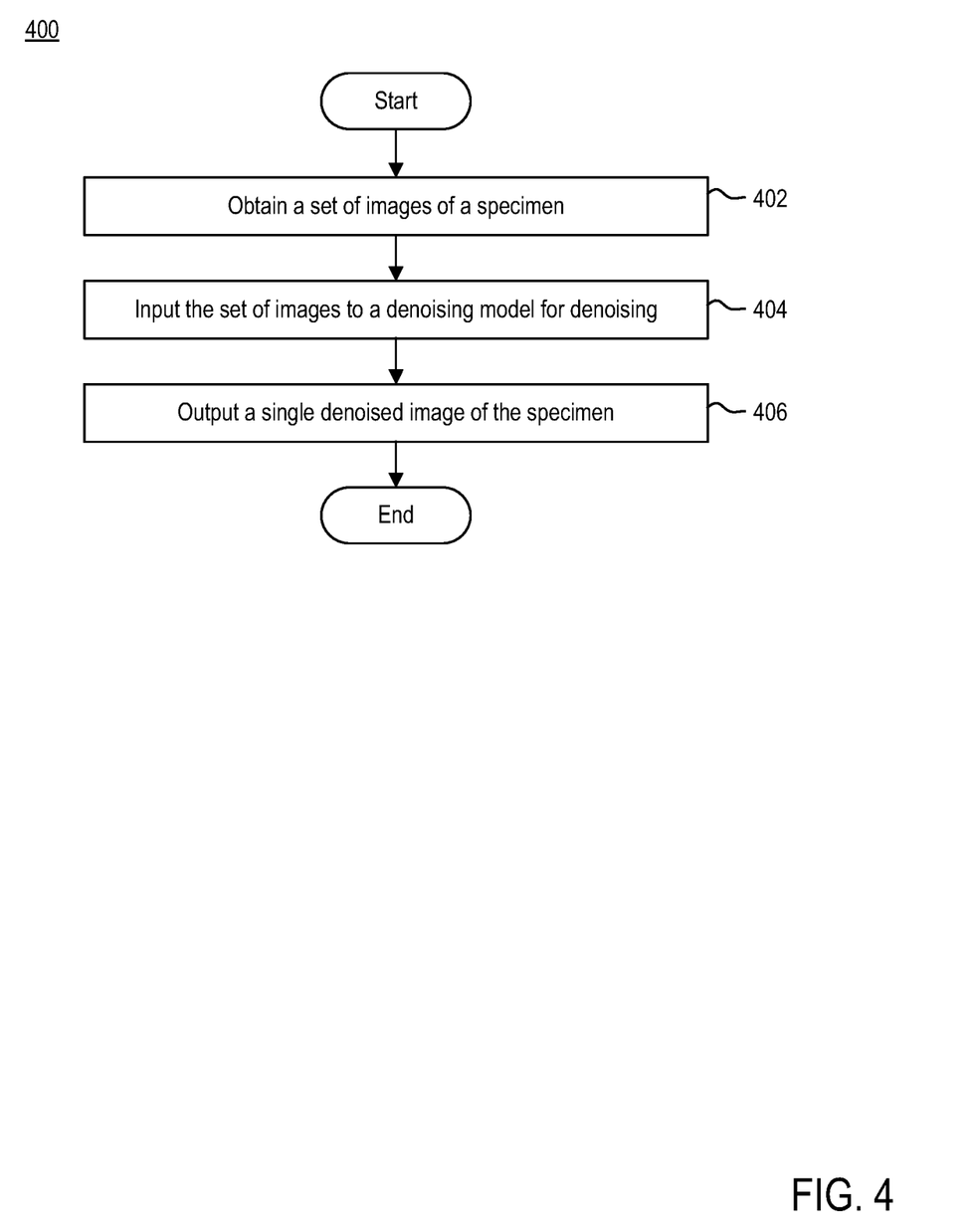
FIG. 4 is a flow diagram illustrating a method of denoising images using a trained denoising method, according to example embodiments.

In some embodiments, denoising model 110 may be first trained and tested on synthetic data alone. In some embodiments, denoising model 110 may be trained on only a medium level of noise, performs well under all noise levels, with a PSNR over thirty. It is substantially better than the mean projection method, which achieves a PSNR of 25 at best. Furthermore, as illustrated in FIG. 4, the standard deviation of the error for the mean projection method is much wider ($\sigma=3.50\%-16.93\%$) compared to that of the denoising model ($\sigma=1.08\%-1.62\%$). As illustrated in FIG. 4, denoising model performance is shown in green and mean projection performance is shown in red. Mean projection has a wider higher error and wider spread of error.

In this manner, denoising model 110 produces more repeatable results compared to conventional approaches.

Further, for the traditional method of mean projection, the error for the mean projection method decreases from 24% MSE to 2% MSE as the number of images used in denoising exponentially increases. It typically takes the mean projection method an enormous number of images (e.g., 1000 images) to achieve the same level of denoising as denoising model 110 is capable of achieving with only five images. For example, Table 2, shown below, provides the mean error and standard deviation as a percentage of the dynamic range of the image. As provided, the conventional mean projection method takes around 1000 images to achieve the same level of denoising with as few as two to five images.

TABLE 2

| Method | # of Images | % MSE |
| --- | --- | --- |
| Conventional Mean Projection Model | 5 | 23.66% ± 17$\sigma$ |
| | 100 | 5.26% ± 5$\sigma$ |
| | 1000 | 1.66% ± 1.26$\sigma$ |
| Deep Denoise Model | 5 | 1.66% ± 1.6$\sigma$ |

In some embodiments, denoising model 110 may be fine-tuned and tested on empirical data.

Figure 3:
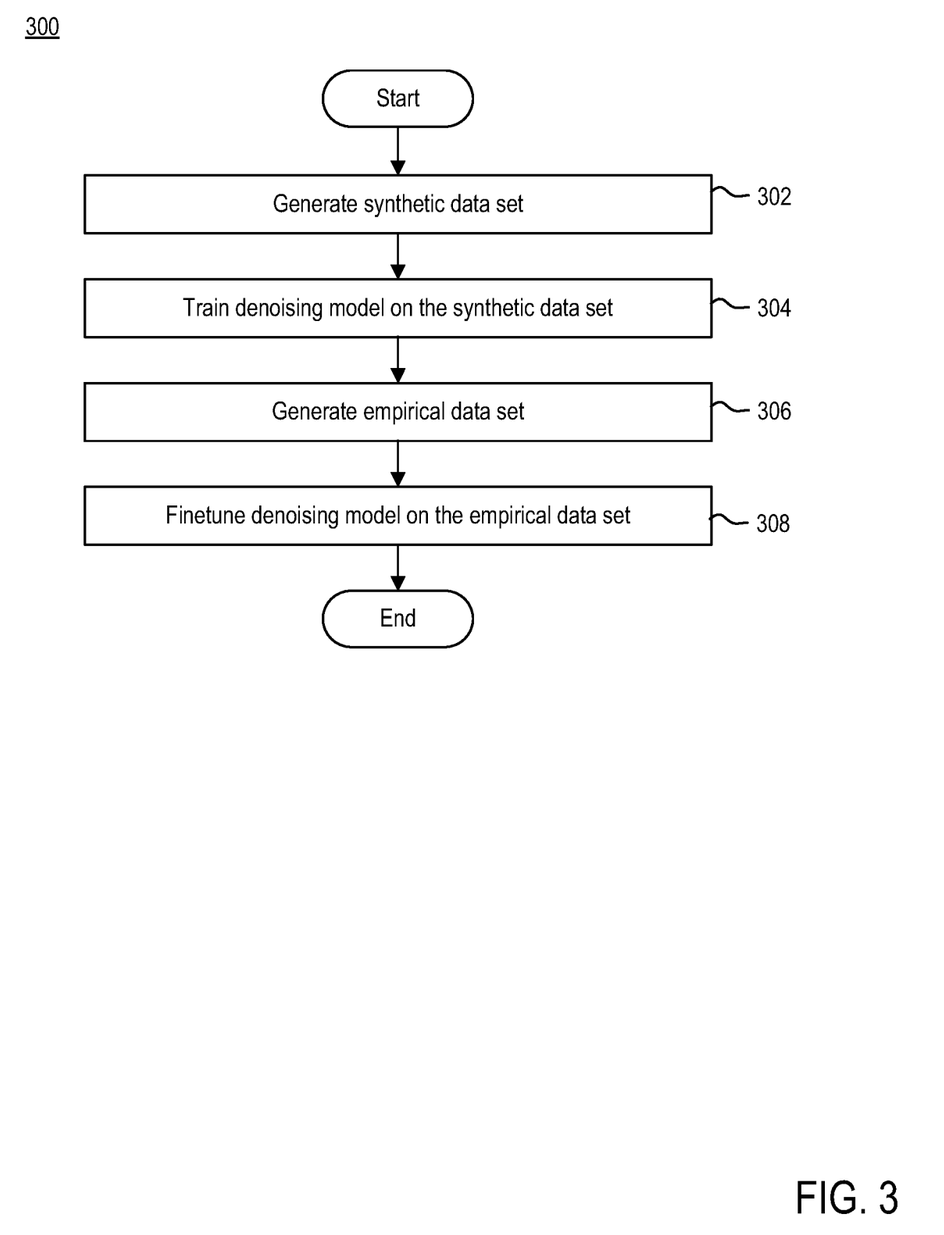
FIG. 3 is a flow diagram illustrating a method of training a denoising model, according to example embodiments.

FIG. 3 is a flow diagram illustrating a method 300 of training denoising model 110, according to example embodiments. Method 300 may begin at step 302.

At step 302, a synthetic data set may be generated. In some embodiments, the synthetic data set may be generated by computing system 104. Synthetic dataset may include, but is not limited to, data approximating known images, golden templates, pertinent warped images of known features, and the like. For example, one-hundred images were set aside for testing; the remaining images may be split into a set of 800 for training and 200 for validation. In some embodiments, a plurality (e.g., five) of noisy images may be generated for every synthetic image by adding Gaussian noise. For example, for the test data, low ($\sigma$=200 or 13%), medium ($\sigma$=600 or 40%), and high ($\sigma$=1000 or 66%) Gaussian noise may be added. Generally, noise may be added as dictated by the image application.

At step 304, computing system 104 may train denoising model 110 on the synthetic data set. For example, denoising model 110 may learn, based on the synthetic data set, how to denoise an image or images.

At step 306, computing system 104 may generate an empirical data set for finetuning denoising model 110. For example, computing system 104 may generate geometric objects (e.g., polygons, circles, ellipses, and the like) to be placed inside a background image for imaging apparatus 102 to capture to generate the empirical data set. In some embodiments, computing system 104 may introduce and shape irregularities to reproduce the empirical dataset. For example, computing system 104 may randomly cut out parts of the triangle using another triangle. To replicate the empirical data, each dark triangle may include an intensity gradient along the top, ranging from background value to triangle's value, which may span two-fifths of the triangle's height. For example, the probability of placing a dark triangle may be 0.5, a gray triangle is 0.35, and a white triangle is 0.15. In some embodiments, the empirical dataset may be collected using an automated fluorescence inspection tool. In some embodiments, imaging may be performed by imaging apparatus 102.

At step 308, computing system 104 may finetune denoising model 110 using the empirical data set. For example, computing system 104 may perform another round of training for denoising model 110 using the actual images generated for the empirical data set.

FIG. 4 is a flow diagram illustrating a method 400 for denoising images of a specimen, according to example embodiments. Method 400 may begin at step 402.

At step 402, computing system 104 may obtain a set of images of a specimen. For example, computing system 104 may receive, from imaging apparatus 102, a set of images of specimen 106 against background 108. Generally, the set of images may include at least two images of specimen 106 against background 108.

At step 404, computing system 104 may input the set of images of specimen 106 into trained denoising model 110. Denoising model 110 may be configured to analyze the set of images to generate a single denoised image. For example, denoising model 110 may process the sets of images to remove noise therefrom.

At step 406, computing system 104 may output a single denoised image of the specimen. For example, as provided above, denoising model 110 may output a single denoised image based on the set of images provided as input thereto. The single denoised image may be used by computing system 104 or other computing systems for downstream analysis of specimen 106 contained in the single denoised image.

Figure 5A:
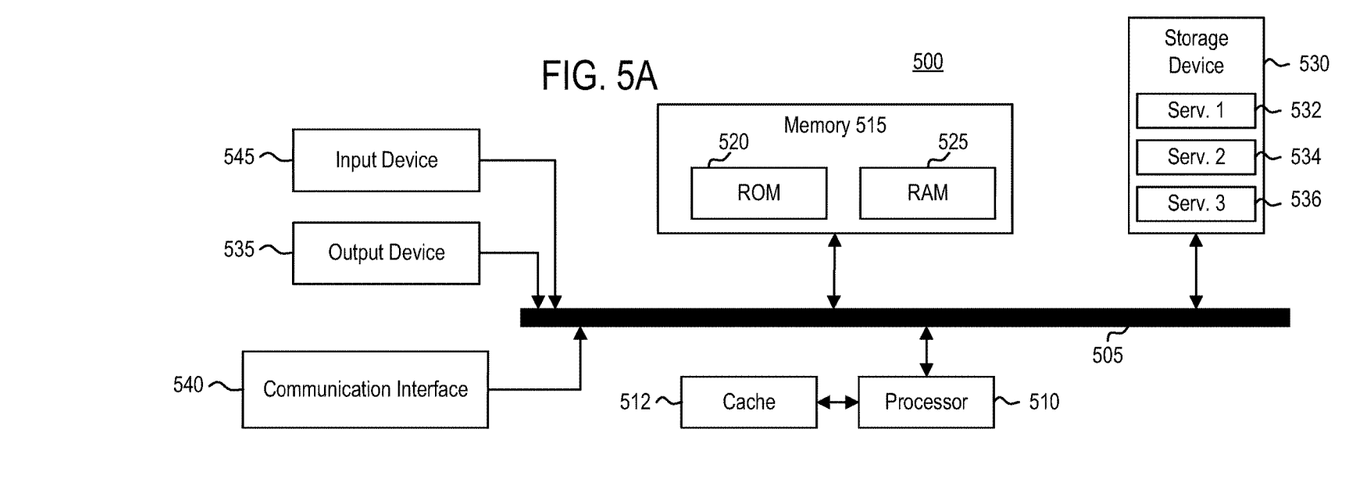
FIG. 5A illustrates a system bus computing system architecture, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of, processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 5 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communication interface 540 can generally govern and manage the user input and system output. There is no restriction on operating on any particular hardware arrangement, and therefore the basic features here may easily be substituted for improved hardware or firmware arrangements as they are developed.

Storage device 530 may be a non-volatile memory and can be a hard disk or other type of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

Figure 5B:
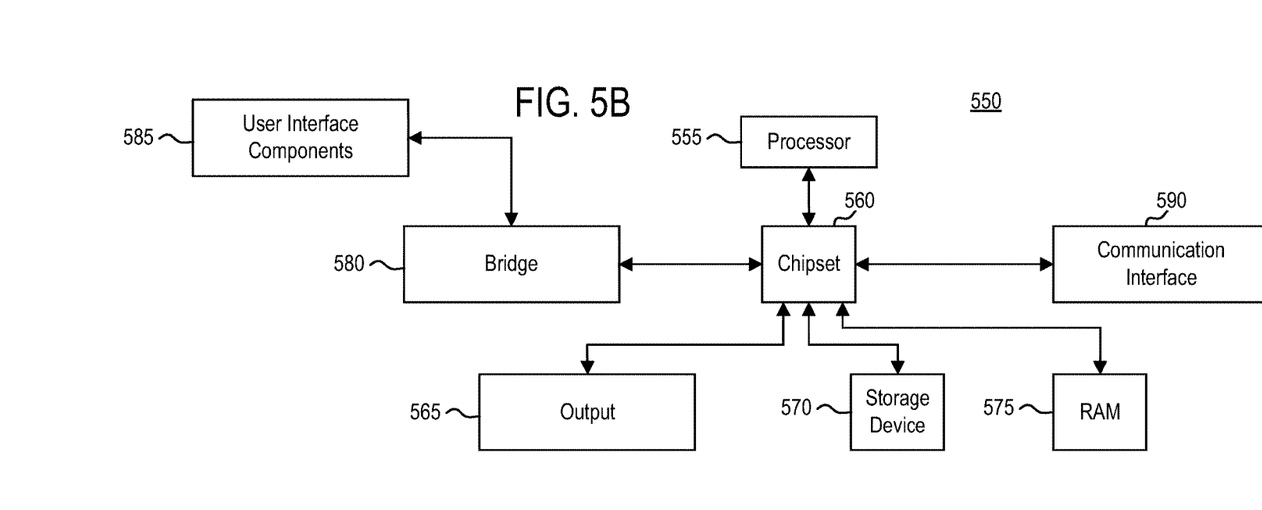
FIG. 5B illustrates a computer system having a chipset architecture, according to example embodiments.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510, 555 or be part of a group or cluster of computing devices networked together to provide greater processing capability.

As discussed above, the one or more techniques provided herein uses a deep learning model based on the U-Net architecture that requires at least two (e.g., five) noisy images to produce a denoised image. In comparison, for synthetic data with high amount of noise, the traditional approach of average projection required 1000 images in contrast to the at least two (e.g., five) using the present denoising model. The denoising model is also capable of achieving an improved level of denoising on empirical data with at least two (e.g., 5 images), thus, reducing the effect of photo-bleaching that is detrimental to the quality of the empirical fluorescent samples.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A system, comprising:
an imaging apparatus configured to perform darkfield imaging of a specimen; and
a computing system in communication with the imaging apparatus, the computing system comprising one or more processors and a memory, the memory having programming coded thereon, which, when executed by the one or more processors, causes the computing system to perform operations comprising:
obtaining, by the computing system, a plurality of noisy images of the specimen captured by the imaging apparatus using darkfield imaging, wherein the plurality of noisy images includes at least two images of the specimen captured using darkfield imaging;
denoising, by the computing system, the plurality of noisy images by inputting the plurality of noisy images of the specimen into a convolutional neural network trained to output a single denoised image of the specimen; and
generating, as output from the convolutional neural network, the single denoised image of the specimen.

2. The system of claim 1, wherein the operations further comprise:
generating, by the computing system, a synthetic data set for training the convolutional neural network, the synthetic data set comprising a plurality of synthetic images and, for each synthetic image, a plurality of noisy images derived from the respective synthetic image; and training, by the computing system, the convolutional neural network to denoise a target plurality of noisy images based on the synthetic data set.

3. The system of claim 2, wherein the operations further comprise:

generating, by the computing system, an empirical data set for finetuning the convolutional neural network following the training; and finetuning, by the computing system, the convolutional neural network based on the empirical data set.

4. The system of claim 3, wherein generating, by the computing system, the empirical data set for finetuning the convolutional neural network following the training comprises:

generating a plurality of geometric objects to be placed inside a background image for capturing by the imaging apparatus; and receiving, from the imaging apparatus, a plurality of finetuning images based on the plurality of geometric objects placed inside the background image, the plurality of finetuning images defining the empirical data set.

5. The system of claim 4, wherein the operations further comprise:

introducing shape irregularities to the plurality of geometric objects placed inside the background image.

6. The system of claim 1, wherein the convolutional neural network comprises a downsampling portion followed by an upsampling portion.

7. The system of claim 1, wherein the computing system is a component of the imaging apparatus.

8. A method comprising:

obtaining, by a computing system, a plurality of noisy images of a specimen captured by an imaging apparatus using darkfield imaging, wherein the plurality of noisy images includes at least two images of the specimen captured using darkfield imaging;

denoising, by the computing system, the plurality of noisy images by inputting the plurality of noisy images of the specimen into a convolutional neural network trained to output a single denoised image of the specimen; and generating, as output from the convolutional neural network, the single denoised image of the specimen.

9. The method of claim 8, further comprising:

generating, by the computing system, a synthetic data set for training the convolutional neural network, the synthetic data set comprising a plurality of synthetic images and, for each synthetic image, a plurality of noisy images derived from the respective synthetic image; and training, by the computing system, the convolutional neural network to denoise a target plurality of noisy images based on the synthetic data set.

10. The method of claim 9, further comprising:

generating, by the computing system, an empirical data set for finetuning the convolutional neural network following the training; and finetuning, by the computing system, the convolutional neural network based on the empirical data set.

11. The method of claim 10, wherein generating, by the computing system, the empirical data set for finetuning the convolutional neural network following the training comprises:

generating a plurality of geometric objects to be placed inside a background image for capturing by the imaging apparatus; and receiving, from the imaging apparatus, a plurality of finetuning images based on the plurality of geometric objects placed inside the background image, the plurality of finetuning images defining the empirical data set.

12. The method of claim 11, further comprising:

introducing shape irregularities to the plurality of geometric objects placed inside the background image.

13. The method of claim 8, wherein the convolutional neural network comprises a downsampling portion followed by an upsampling portion.

14. The method of claim 8, wherein the computing system is a component of the imaging apparatus.

15. A non-transitory computer readable medium comprising one or more sequences of instructions, which, when executed by one or more processors, causes a computing system to perform operations, comprising:

obtaining, by the computing system, a plurality of noisy images of a specimen captured by an imaging apparatus using darkfield imaging, wherein the plurality of noisy images includes at least two images of the specimen captured using darkfield imaging;

denoising, by the computing system, the plurality of noisy images by inputting the plurality of noisy images of the specimen into a convolutional neural network trained to output a single denoised image of the specimen; and generating, as output from the convolutional neural network, the single denoised image of the specimen.

16. The non-transitory computer readable medium of claim 15, further comprising:

generating, by the computing system, a synthetic data set for training the convolutional neural network, the synthetic data set comprising a plurality of synthetic images and, for each synthetic image, a plurality of noisy images derived from the respective synthetic image; and training, by the computing system, the convolutional neural network to denoise a target plurality of noisy images based on the synthetic data set.

17. The non-transitory computer readable medium of claim 16, further comprising:

generating, by the computing system, an empirical data set for finetuning the convolutional neural network following the training; and finetuning, by the computing system, the convolutional neural network based on the empirical data set.

18. The non-transitory computer readable medium of claim 17, wherein generating, by the computing system, the empirical data set for finetuning the convolutional neural network following the training comprises:

generating a plurality of geometric objects to be placed inside a background image for capturing by the imaging apparatus; and receiving, from the imaging apparatus, a plurality of finetuning images based on the plurality of geometric objects placed inside the background image, the plurality of finetuning images defining the empirical data set.

19. The non-transitory computer readable medium of claim 18, further comprising:

introducing shape irregularities to the plurality of geometric objects placed inside the background image.

20. The non-transitory computer readable medium of claim 15, wherein the convolutional neural network comprises a downsampling portion followed by an upsampling portion.

* * * * *